(12) United States Patent
Ivaturi

(10) Patent No.: US 6,785,738 B1
(45) Date of Patent: Aug. 31, 2004

(54) ARP PACKET TO PRESERVE CANONICAL FORM OF ADDRESSES

(75) Inventor: Devi Prasad Ivaturi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/471,903

(22) Filed: Dec. 23, 1999

(51) Int. Cl.[7] ............................................... G06F 15/16
(52) U.S. Cl. ...................... 709/245; 709/238; 711/200; 711/202; 711/203; 711/218; 370/409
(58) Field of Search ............................... 709/245, 238; 711/200, 202, 203, 218; 370/409

(56) References Cited

U.S. PATENT DOCUMENTS

| | | | |
|---|---|---|---|
| 5,331,637 A | 7/1994 | Francis et al. | 370/54 |
| 5,353,283 A | 10/1994 | Tsuchiya | 370/60 |
| 5,442,633 A | 8/1995 | Perkins et al. | 370/94.1 |
| 5,485,455 A * | 1/1996 | Dobbins et al. | 370/60 |
| 5,521,910 A * | 5/1996 | Matthews | 370/54 |
| 5,583,996 A | 12/1996 | Tsuchiya | 395/200.15 |
| 5,600,644 A | 2/1997 | Chang et al. | 370/404 |
| 5,633,866 A | 5/1997 | Callon | 370/397 |
| 5,818,842 A | 10/1998 | Burwell et al. | 370/397 |
| 5,828,844 A | 10/1998 | Civanlar et al. | 395/200.58 |
| 5,898,686 A | 4/1999 | Virgile | 370/381 |
| 5,909,441 A | 6/1999 | Alexander, Jr. et al. | 370/395 |
| 5,909,550 A | 6/1999 | Shankar et al. | 395/200.57 |
| 6,101,170 A * | 8/2000 | Doherty et al. | 370/255 |
| 6,172,981 B1 * | 1/2001 | Cox et al. | 370/401 |
| 6,175,571 B1 * | 1/2001 | Haddock et al. | 370/423 |
| 6,195,356 B1 * | 2/2001 | Anello et al. | 370/398 |
| 6,343,083 B1 * | 1/2002 | Mendelson et al. | 370/466 |

* cited by examiner

Primary Examiner—Rupal Dharia
Assistant Examiner—Adnan Mirza
(74) Attorney, Agent, or Firm—Cesari and McKenna, LLP

(57) ABSTRACT

The invention is a new field in an ARP packet which designates the canonical format of the addresses written into fields such as ar$sha (the source station hardware address) and ar$spa (the source station protocol address) ar$tha (the target station hardware address), ar$tpa (the target station protocol address) so that a receiving station can determine the canonical format used to create these fields. The station receiving the ARP request or ARP response packet can then write its ARP table entry in the correct canonical format for its computer network.

8 Claims, 5 Drawing Sheets

ARP PACKET TO PRESERVE CANONICAL FORM OF ADDRESSES

FIELD OF THE INVENTION

This invention relates to bridging of Address Resolution Protocol packets (ARP packets) in computer networks, and in particular to bridging between networks using different canonical format, that is between networks transmitting the least significant bit first to networks transmitting the most significant bit first, and vice versa.

BACKGROUND OF THE INVENTION

The order of the bits in a data packet is different in different standard computer networks. For example, the bit order for data packets in an Ethernet IEEE 802.3 computer network, or in an older Ethernet network, is in "canonical" format. In canonical format the least significant bit is transmitted first.

In contrast, IEEE 802.5 token ring networks and Fiber Distributed Data Interface (FDDI) token ring networks have the data packet transmitted in "non-canonical" format. In non-canonical format the most significant bit is transmitted first.

Networks other than Ethernet may use canonical format in transmission of packets. Also, networks other than IEEE 802.5 and FDDI may use non-canonical format in transmission of packets.

The order of the bits must be swapped for a data packet in canonical format to be understandable by a station using non-canonical format, and vice versa. In particular, for the addresses in the Layer 2 header, the MAC addresses, the order of bits must be swapped for the addressing information of a packet to be understandable by computers on networks using different bit order. That is, the order of the MAC layer (Layer 2) address bits in the packet must be swapped when a data packet is bridged from a source computer network using one canonical format to a destination computer network using the other canonical format, in order for the receiving computer to recognize its own address in the MAC destination address field.

A further difference between Ethernet IEEE 802.3 computer networks and token ring IEEE 802.5 computer networks is that the Ethernet networks use transparent bridging, where in contrast, the token ring IEEE 802.5 computer networks use source route bridging (abbreviated SRB). Again, there may be a variety of computer networks which use transparent bridging, and also a variety of networks which use source route bridging.

Transparent bridging is a method of operating a bridge that forwards a packet from a source LAN to a destination LAN, and where the packet transmitted by the source station is exactly like the packet would be if the destination station were located on the source LAN. In contrast, source route bridging (SRB) is a technique where the packet transmitted by the source station carries a designation of the route which the packet is to follow in order to reach the destination station.

Transparent bridging is ordinarily used to bridge between a number of different types of networks, for example, Ethernet networks, IEEE 802.5 token ring networks, FDDI networks, Asynchronous Transfer Mode (ATM), Serial, and many other networks.

In contrast, SRB is ordinarily used to bridge between only IEEE 802.5 networks, or to bridge between FDDI token ring networks.

Bridges known as Source route, Translating Bridges (SR/TLB bridges) are used to bridge between transparent bridging domains and SRB domains. Often the transparent bridging domains use canonical format in their transmission media, while in contrast, the SRB domain uses non-canonical format in its transmission media. An example is bridging between an Ethernet domain to an IEEE 802.5 token ring domain. MAC addresses are bit swapped when a packet is bridged between canonical to non-canonical media.

The MAC addresses (that is the Layer 2 address) are bit swapped during SR/TLB bridging. In ordinary engineering design, no fields beyond the MAC header are bit-swapped during SR/TLB bridging. A bridge which bridges between media using canonical format to media using non-canonical format is sometimes referred to simply as a translating bridge, or "TLB" bridge.

Issues in canonical format and non-canonical format, including translating bridges, are discussed by Radia Perlman in her book *Interconnections*, published by Addison Wesley with Copyright date of 1992, all disclosures of which are incorporated herein by reference, particularly at pages 31–33. Also, operation of a translating bridge such as a SR/TLB bridge is discussed in documentation provided by Cisco Systems, Inc., on its web page at URL www.cisco.com, and particularly the document "Configuring Source Route Bridging", at its "Bridging Between Source-Route Bridge Groups and Transparent Bridge Groups SR/TLB" section, all disclosures of which are incorporated herein by reference.

As an example, it is standard engineering practice for a SR/TLB bridge, when forwarding a packet from an Ethernet to a token ring, or from a token ring to an Ethernet, that is across a heterogeneous media boundary, to swap the bits of the MAC addresses, but not to swap the bits of the data field. Thus, any data carried in the data field across the boundary between heterogeneous media will not have its bits swapped.

An Address Resolution Protocol packet (ARP packet) is used by a station which desires to send a data packet to a target station, in order to learn the hardware address of the target station, in the event that the sending station knows the protocol address of the target station but does not know the hardware address of the target station. An ARP packet is defined in RFC 826, all disclosures of which are incorporated herein by reference. An RFC is a Request For Comments documents prepared by the Internet Engineering Task Force, or IETF. The RFC documents are available from the IETF web site at the URL www.ietf.org.

In accordance with RFC 826, the sending station generates an ARP request packet having the source station MAC address in the ARP packet Layer 2 source address (SA) field, and a broadcast address in the ARP packet Layer 2 destination address (DA) field.

Also in accordance with RFC 826, the ARP request packet caries information in its data field. In particular, field ar$sha in the data field of the ARP request packet contains the Ethernet hardware address of the sending station, and also field ar$spa of the ARP request packet contains the protocol address (Layer 3 address) of the sending station. An ARP request packet is a search tool used by a sending station to look for an intended target station, arid the protocol address of the desired target station is carried in a field ar$tpa.

In an example wherein all stations are assumed to be operating on a computer network using the same canonical format, all stations receive the ARP request packet because the MAC DA field contains the broadcast address. Upon receipt of the ARP request packet, a receiving station examines the contents of the ar$tpa field. A station recognizing its protocol address (for example, its IP address) then updates its ARP table with the contents of the fields ar$sha and ar$spa read from the data field of the ARP request packet. The target station then transmits an ARP response packet to the sending station. The target station places its hardware address in field ar$sha of the ARP response packet, in order to give its hardware address to the sending station. Also the target station places its protocol address in the field ar$spa of the ARP response packet.

The ARP protocol of RFC 826 works when the packets are bridged from a source computer network to a destination computer network, where both networks use the same canonical format of the bit order. Operation of the ARP protocol is discussed by Radia Perlman in her above mentioned book *Interconnections* at pages 198–200, and also the ARP protocol is discussed in RFC 826.

However, in the event that the ARP request packet is originated by a sending station on a canonical LAN, and the ARP request packet is bridged from the canonical LAN to a non-canonical LAN by a translating bridge, SR/TLB, or a translating bridge TLB, the MAC address fields will be bit swapped but the data fields will not be bit swapped. So the bridged ARP packet will have the proper source MAC address and the proper broadcast destination MAC broadcast address, but the fields ar$sha, ar$spa, and ar$tpa will not be bit swapped. Accordingly, the intended target station will receive the ARP request packet by recognizing the non-canonical broadcast address in the MAC DA field. However the non-canonical intended target station will update its ARP table with a canonical MAC address of the sending station by reading the ar$sha field of the ARP request packet. When the intended target station sends the ARP reply packet, it fills in the MAC header by using its ARP table, and so writes a canonical destination address into the MAC DA field of the ARP reply packet. The SR/TLB bridge bit swaps the source address in the MAC header into a non-canonical form before transmitting the packet onto the canonical LAN of the source station. So as a result, the source station, which is on the canonical LAN, cannot recognize its own MAC address in the ARP reply packet destination address field. Accordingly, the station which originated the ARP request will not receive the reply.

An example helps to clarify the problem. Suppose that a station E on an Ethernet LAN attempts, at a higher protocol layer, to transmit a packet to a station T on an IEEE 802.5 token ring network. First station E checks its ARP table for an entry for the target destination station T, and finds no entry. Then station E generates an ARP request packet with its Ethernet address in both the MAC SA field and the ar$sha field, and also its IP address in the ar$spa field; and station E also places the IP address of the target destination station in the ar$tpa field. The MAC DA field contains the broadcast address so that each station detecting the packet will receive it and examine the Layer 3 IP field ar$tpa to determine if it is the target end station. The MAC DA and MAC SA fields are now in canonical format, as required by an Ethernet LAN. The translating bridge SRITLB then bit swaps the MAC DA and MAC SA fields, but does not bit swap any of the data fields, the ar$sha field, the ar$spa field, or the ar$tpa field. The MAC DA and MAC SA are now in non-canonical format, as required for an IEEE 802.5 token ring LAN. All stations detect the ARP Request packet because of the MAC broadcast DA address. The target station T receives the ARP request packet by reading the field ar$tpa and recognizing its IP address. The target station T then updates its ARP table using the contents of the field ar$sha in canonical format.

When the intended target station T sends the unicast ARP reply packet, it fills in the MAC header by using its ARP table, and so writes a canonical destination address into the MAC header of the ARP reply packet. The SR/TLB bridge bit swaps the source address in the MAC header into non-canonical form before transmitting the packet onto the canonical LAN of the source station. So as a result, the source station S, which is on the canonical LAN, cannot recognize its own MAC address in the ARP reply packet destination address field. Accordingly, the station S which originated the ARP request will not receive the reply.

There is needed a method to use ARP request and response packets between hetrogeneous media, that is from a LAN using one canonical format to a LAN using another canonical format, in order to build usable ARP table entries in end stations.

SUMMARY OF THE INVENTION

The invention is a new field in an ARP packet which designates the canonical format of the addresses written into fields such as ar$sha (the source station hardware address) and ar$spa (the source station protocol address) so that a receiving station can determine the canonical format used to create these fields. The station receiving the ARP request or ARP response packet can then write its ARP table entry in the correct canonical format for its computer network.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views.

DETAILED DESCRIPTION OF AN ILLUSTRATIVE EMBODIMENT

Figure 1:
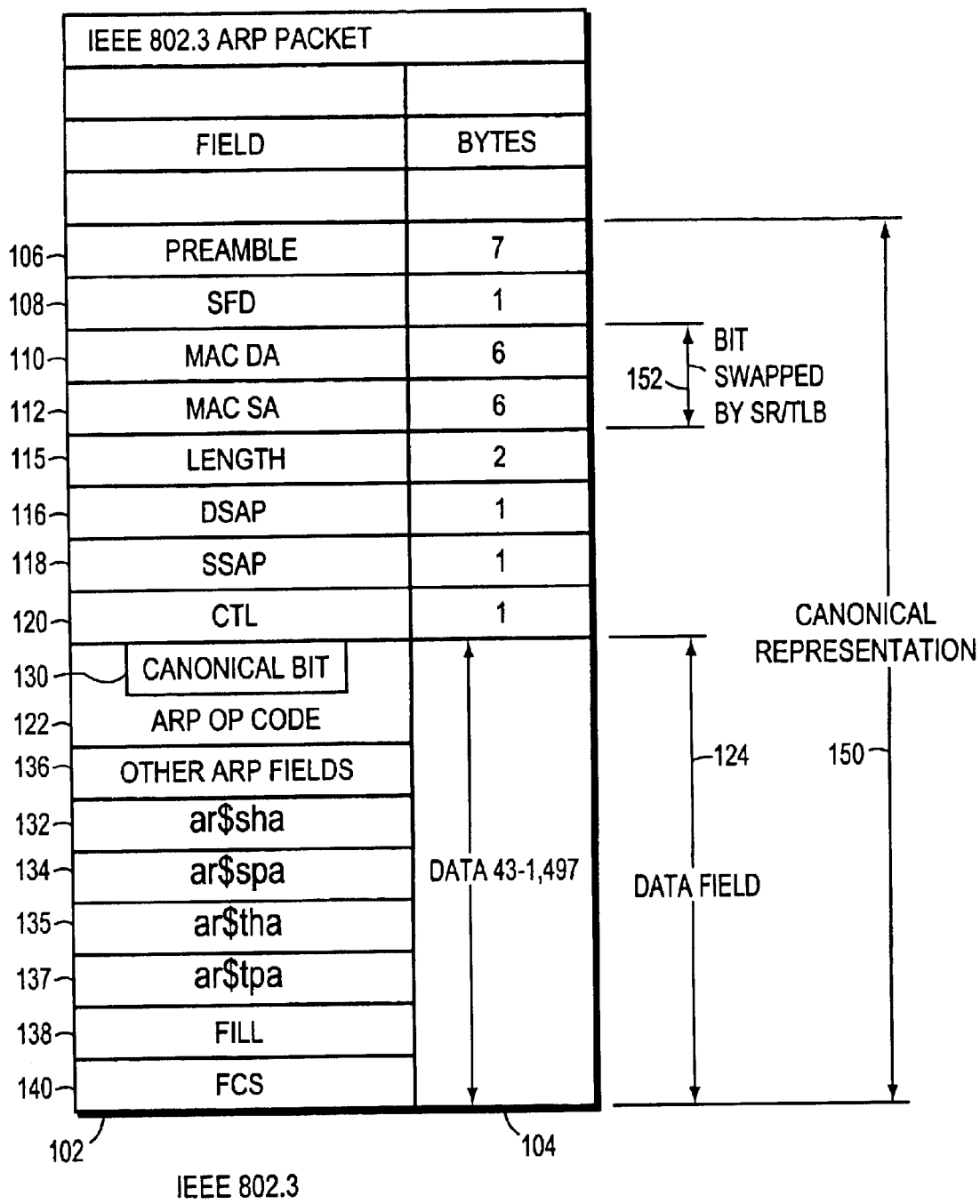
FIG. 1 is a block diagram of an IEEE 802.3 Ethernet ARP packet in accordance with the invention.

Turning now to FIG. 1, there is shown an Address Resolution Protocol (ARP) packet in accordance with the IEEE 802.3 Ethernet standard. Various fields of IEEE 802.3 ARP packet 100 are shown. The field name is indicated in column 102, and the number of bytes of the field are indicated in column 104. Field 106 is the preamble and is seven (7) bytes in length. Field 108 is the Stop Field Delimiter (SFD) and is one (1) to byte in length. Field 110 is the Layer 2, or MAC address, (MAC DA, and is six (6) bytes in length. Field 112 is the Layer 2 source address, or MAC SA address and is six bytes in length. Field 115 is the Length field and is two (2) bytes in length. Field 116 is the DSAP field and is one (1) byte in length. Field 118 is the SSAP field and is one (1) byte in length. Field 120 is a control field (CTL) and is one (1) byte in length. The previously mentioned fields are the Layer 2 header fields of the packet. The specific fields for the ARP information follow.

In an alternative embodiment of the invention, FIG. 1 may represent a traditional Ethernet packet. In the event that FIG. 1 represents a traditional Ethernet packet, then field 115 is the "Ether Type", rather the "Length" field. Differences between traditional Ethernet packets and IEEE 802.3 Ethernet packets are described by Radia Perlman in her above mentioned book *Interconnections* at page 36. Particularly, the maximum packet length is 1500 bytes, and so all "Ethernet Types" were assigned to larger numbers than 1500 so that parsing of field 115 would yield unique results.

The ARP Operation Code (OP Code) field 122 is in the Layer 2 data field, indicated by arrow 124. Field 130 is the canonical bit and is one bit in length. Canonical bit field 130 is shown as being in ARP OP Code field 122, as it is a one bit field, and is the most significant bit (MSB) of the ARP OP Code field 122.

Field ar$sha field 132 is the ARP source address. Field 134 ar$spa field is the source station protocol address, or IP address of the source station. Field 135 ar$tha is the hardware address of the target station. Field 137 ar$tpa is the protocol address of the target station. Field 136 contains other ARP fields as specified by RFC 826.

Field 138 is fill in order to bring the length of the field to the minimum Ethernet packet length. Field 140 is the frame control sequence field (FCS).

All fields set out in IEEE 802.3 ARP packet 100 are in canonical format, as indicated by arrow 150. As the ARP packet is bridged by a SR/TLB translating bridge, the bits of the MAC DA 110 and MAC SA 112 fields indicated by arrow 152 are bit swapped.

Field 130, containing the canonical bit, is an indicator giving the canonical status of the data written into fields of data field 124.

The value found in field 130 of the canonical bit informs a receiving station which canonical form the data is written in fields 124, and also in the MAC header fields other is than the MAC DA 110 and MAC SA 112, that is the MAC header fields which are not bit swapped. When the canonical bit in field 130 has a value "1" the data in fields 124, and also the MAC header fields which are not bit swapped, is written in canonical format. Alternatively, when the canonical bit in field 130 has a value "0", the data in fields 124, and also the MAC header fields which are not bit swapped, is written non-canonical format. Thus, with knowledge of the value of the canonical bit, the receiving station can properly interpret all fields of the ARP Request packet.

Also, when the packet is an ARP reply packet, the value of the canonical bit in field 130 permits the receiving station to properly interpret the values written into all of the fields of the received packet.

The fields of the ARP packet, as set forth in RFC 826 are as set forth:

Ethernet Transmission Layer 48 bit: Ethernet address of destination.
48 bit: Ethernet address of sender.
16 bit: Protocol type=ether_type$ADDRESS_RESOLUTION Ethernet packet data:

16 bit (ar$hrd) Hardware address (e.g., Ether net, packet radio net, etc.)
16 bit: (ar$pro) protocol address. For Ether net hardware, this is from the set of type fields Ether_typ$<protocol>.
8 bit: (ar$hln) byte length of each hardware address 8 bit: (ar$pln) byte length of each protocol address
16 bit: (ar$op) op code (ares_op$REQUEST, or ares_op$REPLY)
nbytes: (ar$sha) hardware address of sender of this packet, n from the ar$hln field.
nbytes: nbytes (ar$spa) protocol address of sender of this packet, n from the ar$pln field.
nbytes: (ar$tha) hardware address of target of this packet (if known).
nbytes: (ar$tpa) protocol address of target.

Figure 2:
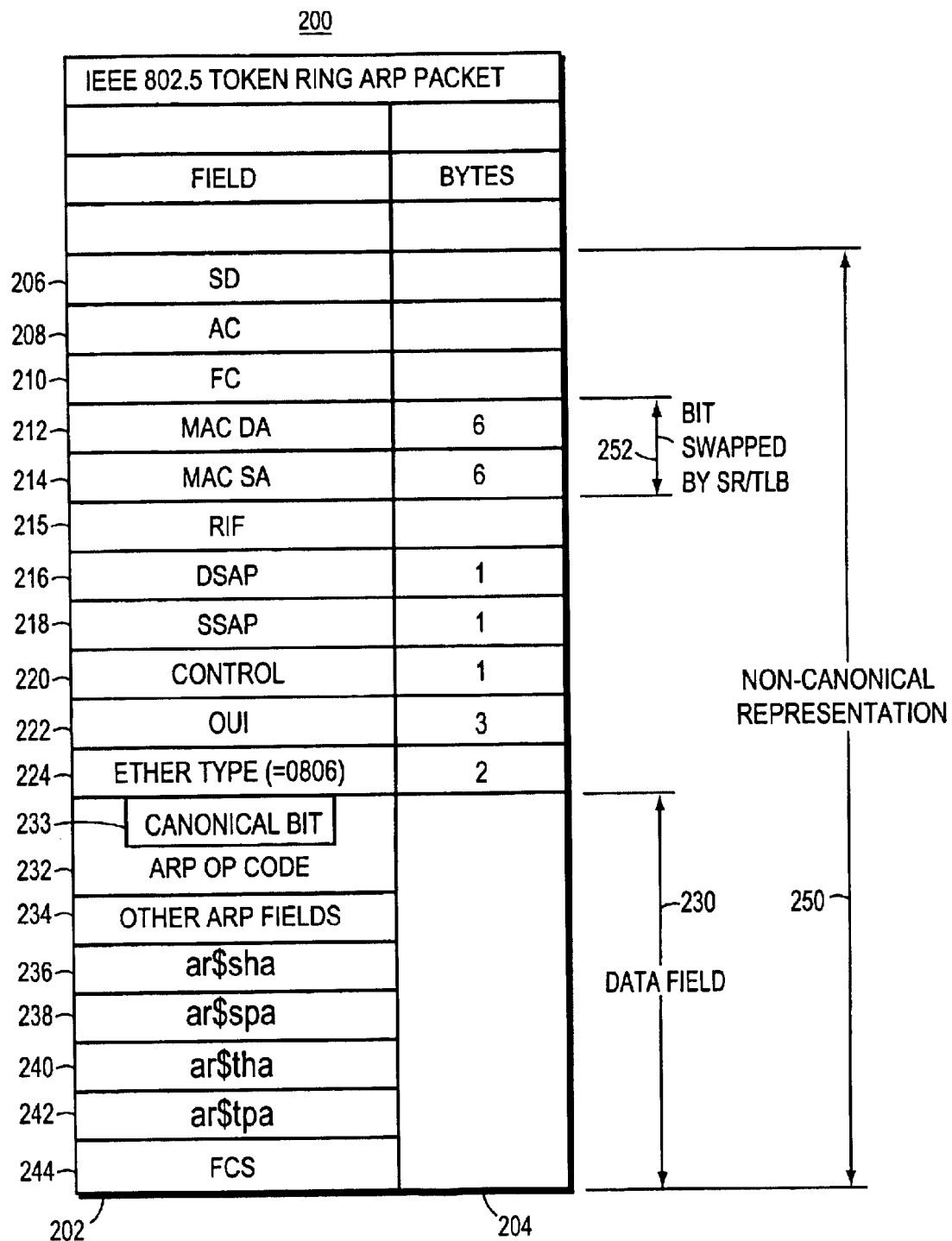
FIG. 2 is a block diagram of an IEEE 802.5 token ring ARP packet in accordance with the invention.

Turning now to FIG. 2, IEEE 802.5 token ring ARP packet 200 is shown. Fields of IEEE 802.5 token ring ARP packet 200 are shown in column 202, and the number of bytes in the corresponding field is shown in column 204. Field 206 is the starting delimiter, SD, and is one byte in length. Field 208 is the access, control field and is One (1) byte in length. Field 210 is the frame control field (FC) and is one byte (1) in length. Field 212 is the MAC layer, or Layer 2, destination address MAC DA and is six (6) bytes in length. Field 214 is the MAC source address MAC SA field and is six (6) bytes in length. Field 215 is the route identification field, and is used in source route bridging to specify the route that a packet takes in a source route bridge network. Field 216 is the DSAP field and is one (1) byte in length. Field 218 is the SSAP field and is one (1) byte in length. Field 220 is a control field and is one (1) byte in length. Field 222 is the OUI field, the organizationally unique identifier field which is used in the SNAP SAP option. Field 224 is an Ether type field and is two (2) bytes in length. Fields 206 through field 224 are the layer 2 header fields of ARP packet 200.

The ARP packet data fields, indicated by arrow 230 are next described.

Field 232 is an ARP Operation Code (ARP OP Code) field. Field 233 is the canonical bit field and is one bit in length. Canonical bit field 233 is the first bit transmitted in the ARP OP Code field 232.

Field 240 represents other ARP packet fields not specifically shown in FIG. 2, and as are defined in RFC 826.

Field 236 contains the hardware address of the source station, field ar$sha of the ARP packet. Field 238 contains the protocol address of the source station, the ar$spa field of the ARP packet. Field 240 contains the hardware address of the target station (in an ARP Reply packet), field ar$tha of the ARP packet. Field 242 contains the protocol address of the target station, field ar$tpa of the ARP packet.

Field 244 is the frame control sequence field (FCS).

Arrow 230 indicates the data field of the ARP packet. Arrow 250 indicates that the entire data packet is transmitted in non-canonical format, that is the bytes are transmitted with the most significant bit transmitted first. Arrow 252 indicates the MAC DA field 212 and the MAC SA field 214 which are bit swapped by a translating bridge, an SR/TLB bridge.

Figure 3:
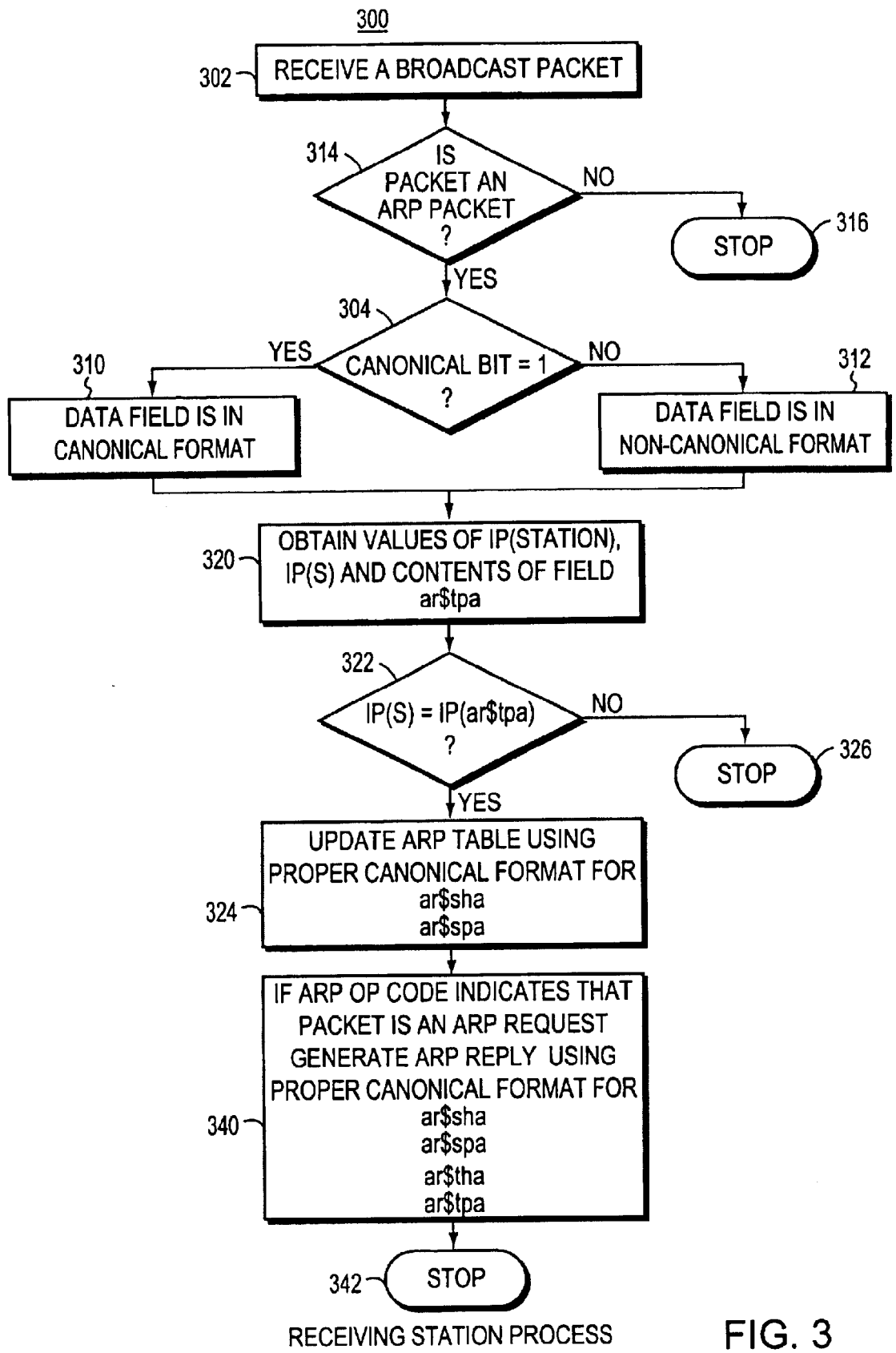
FIG. 3 is a flow chart of a process in accordance with the invention.

Turning now to FIG. 3, flow chart 300 gives an illustrative receiving station process which examines an incoming packet having a broadcast destination MAC address, field 110, field 212, etc. At block 302 the station receives the incoming packet.

At block 314 the packet type is determined to be an ARP packet or not an ARP packet. The determination is done by testing fields as follows: for an IEEE 802.3 Ethernet packet the fields which are interrogated include the Length field 115 along with the DSAP value in Field 116 the SSAP value in field 118 and the CTL value in field 120; for a traditional Ethernet packet field 115 is the Ether Type field and it is interrogated; for an IEEE 802.5 token ring packet Ether Type field 224 is interrogated, etc. Field 115 carries values which distinguish between an IEEE 802.3 packet with a length not exceeding 1500 bytes, and an Ethernet Traditional packet with values larger than 1500. In the event that the type is an ARP packet, then process 300 goes to block 304. In the event that the type is not an ARP packet, then process 300 goes to block 316 where process 300 terminates.

At block 304 the canonical bit is tested. The canonical bit is in field 130, field 233, etc., that is the canonical bit is the most significant bit (MSB) in ARP CODE FIELD 122, 232, etc. In the event that the canonical bit has the value "1", the process goes to block 310 and the data fields are interpreted as being in canonical format. In the event that the canonical bit has the value "0", the process goes to block 312 and the data fields are interpreted as being in non-canonical format. From either block 310 or block 312, the process goes to block 320.

At block 320 process 300 obtains the value of the station protocol address (for example the station IP address) by reading a memory unit (for example a ROM) within the station. Also, the process reads the ar$tpa field of the ARP packet, field 137, field 242, etc., in order to obtain the value of the target station protocol address carried by the ARP packet.

The process 300 then goes to decision block 322 where the station IP address is compared with the target station protocol address read from field ar$tpa of the ARP packet. In the event that the station IP address is the same as the target station protocol address read from the ARP packet, then process 300 goes to block 324. In the event that the station protocol address does not match the ARP packet target station protocol address, then process 300 goes to block 326 where process 300 terminates.

At block 324 the process updates the ARP table of the receiving station in accordance with the algorithm specified by RFC 826. Since process 300 has determined the canonical format in which the data fields of the ARP packet were written, the process obtains correct values from the fields ar$sha, ar$spa, and ar$tpa of the ARP packet and updates its ARP table. For example, field ar$sha is read from field 132, field 236, etc.; field ar$spa is read from field 134, field 238, etc., field ar$tpa is read from field 137, field 242, etc. Then process 300 goes to block 340.

At block 340 the ARP CODE found in field 122, field 232, etc. is examined, and in the event that the ARP packet is an ARP REQUEST packet, the process builds an ARP REPLY packet. In the alternative event that the ARP packet is an ARP RESPONSE packet, the process simply terminates at block 342.

The ARP REPLY packet is generated at block 340 by the process 300 writing into the data fields of the ARP REPLY packet data written in the proper canonical format for the sending station to read, as determined from the canonical bit read from field 130, field 233, etc. of the ARP REQUEST packet. Upon completion of generation of the ARP REPLY packet, then process 300 terminates at block 342.

Figure 4:
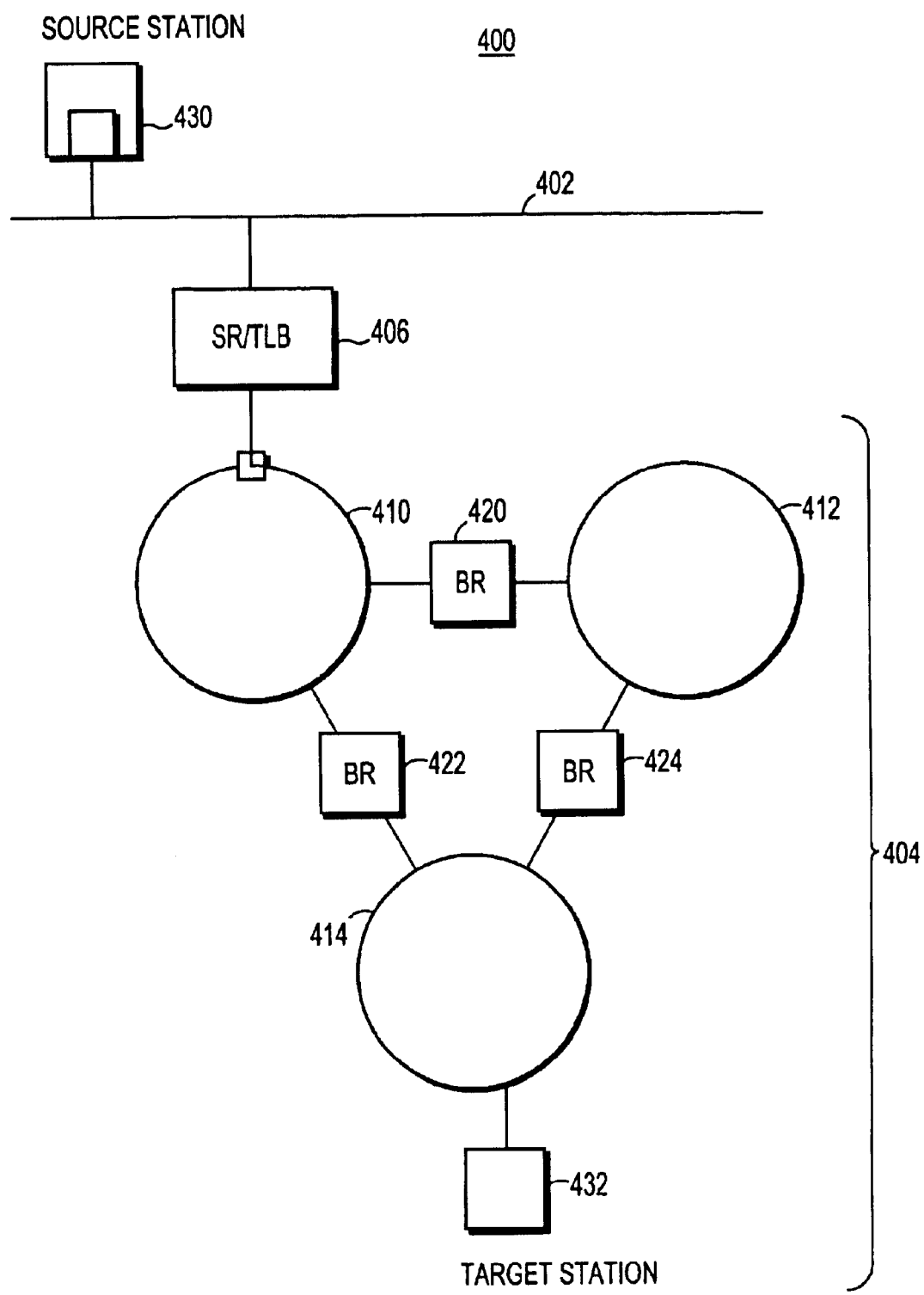
FIG. 4 is a block diagram of a computer network.

Turning now to FIG. 4, computer network 400 has a canonical segment 402 using canonical bit order, and has a non-canonical segment 404 using non-canonical bit order. Translating bridge TLB 406 bridges packets between the canonical segment 402 and the non-canonical segment 404. As an example, canonical segment 402 may be an Ethernet LAN, non-canonical segment 404 may be an IEEE 802.5 token ring using source routing, and translating bridge 406 may be a source routing translating bridge SR/TLB.

Non-canonical segment 404 is shown as comprising a plurality of IEEE 802.5 token rings, comprising token ring 410, token ring 412, and token ring 414. Token ring 410 is joined by bridge 420 to token ring 412. Token ring 410 is joined by bridge 422 to token ring 414. Token ring 412 is joined by bridge 424 to token ring 414.

End station 430 is connected to canonical segment 402. End station 432 is connected to token ring 414, a member of non-canonical segment 404. Many other end stations (not shown) may be connected to canonical segment 402, and also many other end stations (not shown) may be connected to non-canonical segment 404.

We next trace an ARP packet transmitted by end station 430 (referred to as the source end station), where the ARP packet seeks to find end station 432 (referred to as the target end station). End station 430 transmits the ARP packet with the format shown in FIG. 1. MAC DA field 110 contains a broadcast address. MAC SA field 112 contains the MAC address of source end station 430. Canonical Bit field 130 is set to the value "1". The ARP OP Code field 232 indicates that the packet is an ARP Request packet. The MAC address of source end station 430 is in field 132 ar$sha. Field 134 ar$spa contains the protocol address (Layer 3, IP address) of source end station 430. Field 137 ar$tpa contains the protocol address of target end station 432.

The ARP packet is bridged by SR/TLB bridge 406 onto token ring 410, after bit swapping of the MAC DA and MAC SA fields as indicated by arrow 152. After bridging onto non-canonical segment 404, the ARP packet has the format shown in FIG. 2. MAC DA field 212 contains a broadcast address in non-canonical format. MAC SA field 214 contains the MAC address of source station 430, but is written in non-canonical format because the MAC SA field is bit swapped by SR/TLB bridge 406. RIF field 215 is used to collect the path traveled by the ARP Request packet, with bridge and ring numbers being written into RIF field 215.

Upon arrival at target end station 432, the ARP request packet is received because MAC DA field 212 contains the broadcast address in non-canonical format. Upon reception by target end station 432, the ARP request packet is examined by the process of FIG. 3.

At block 314 the packet is identified as either an ARP packet or some other type of packet. This identification is done by interrogating Ether Type field 115 when FIG. 1 represents a traditional Ethernet packet, or the DSAP field 116 the SSAP field 118 and the CTL field 120 in combination when FIG. 1 represents an IEEE 802.3 Ethernet packet, or the Ether type field 224 when the packet is an IEEE 802.5 token ring packet, etc. In the event that the packet is not an ARP packet, process 300 goes to block 316 and terminates. the event that the packet is determined to be an ARP packet, then process 300 goes to block 304.

At block 304 canonical bit field 233 is interrogated. The canonical bit field will be found to have the value "1", as the field was written in canonical format by source end station 430. Accordingly, at block 310 the target end station 432 records that the received packet is written in canonical format. Process 300 then goes to block 320.

At block 320, process 300 reads the contents of ar$tpa field 242 in order to obtain the target station protocol address from the ARP packet. Also, at block 320 the process is reads the protocol address of the end station 432 from a memory device, for example, a ROM, and gives the protocol address the variable identification IP(S).

At block 322 process 300 compares the station protocol address IP(S) with the contents of ar$tpa field 242. In the event that the target end station address of the packet matches the IP address of the receiving station, then process 300 updates the ARP table of the station in accordance with block 324, that is field ar$sha is bit swapped and stored in the ARP table since the canonical bit is "1" (i.e., the packet originated on a canonical media) and the ARP packet is received on a non-canonical token ring port. Note that the canonical MAC address of source station 430 is stored in non-canonical format in target station 432.

In the further event that the received packet is an ARP request packet, then the receiving station generates an ARP Reply packet in accordance with block 340.

The ARP Reply packet has the format shown in FIG. 2 for an IEEE 802.5 token ring packet with the fields written in non-canonical format. ARP Code field 232 indicates that the packet is an ARP Reply packet. The MAC DA is obtained from the ARP table, which was stored in non-canonical format, and filled into the MAC DA field 212 as shown in FIG. 2. The canonical bit field 233 is filled with the value "0" since the reply packet is being sent out on the non-canonical token ring port.

When source end station 430 receives the ARP Reply packet, then process 300 operating in source end station 430 determines if the packet is an ARP Reply packet at block 314. In the event that block 314 determines that the packet is an ARP reply packet, the canonical bit is read at block 304. Block 304 will determine that the canonical bit has the value of "0", and process 300 will go to block 312 where it is recognized that the data in field 324 is in non-canonical format. Station 430 updates its own ARP table with the ar$sha and ar$spa of the received ARP Reply packet by bit swapping the ar$sha since the canonical bit has the value "0", indicating that the packet originated on a non-canonical media and the ARP Reply packet has been received on a canonical port. Note that the non-canonical MAC address of target station 432 is stored in canonical format on source is station 430.

Later, when a regular IP data packet, for example an ICMP echo, is sent by station 430 to station 432, the MAC address of station 432 is obtained from the ARP table and filled in the MAC DA field of layer 2 header. Since this address is stored in the canonical format, and since it is bit-swapped by the SR/TLB bridge into the non-canonical format, station 432 recognizes that this packet is destined to itself, accepts it, and forwards it to upper layers of its protocol s for further processing. The vice versa is true when a regular IP data packet is sent by station 432 to station 430.

Accordingly, the use of the canonical bit solved the problem of ARP Reply packets being dropped by the source station, thus facilitating regular upper layer data traffic to flow seamlessly.

Figure 5:
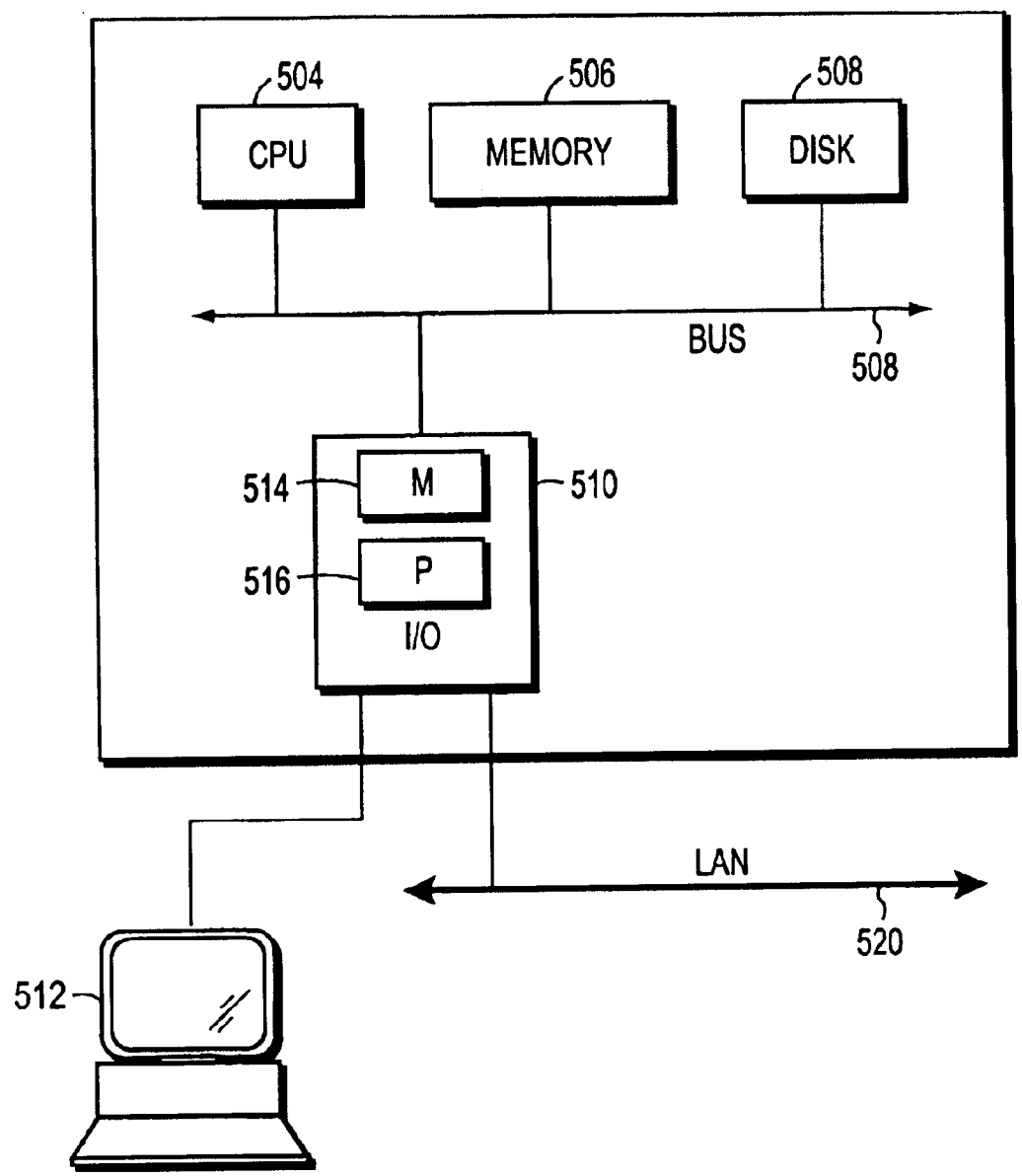
FIG. 5 is a block diagram of a computer.

Turning now to FIG. 5, computer system 500 is shown. Bus 502 connects to central processor unit (CPU) 504, memory 506, disk drive 508, and input/output (I/O) unit 510. I/O unit 510 connects to video monitor and keyboard 512, and connects to local area network (LAN) 520. I/O unit 510 has local memory 514. I/O unit, may, alternatively, have a local processor 516 which aids in assembling packets, transmitting packets, receiving packets, transferring packets to memory 506, etc. Computer code stored either on disk drive 508 or in memory 514 may execute in CPU 504 in order to carry out the steps of the invention.

Disk drive 508 may be an internal hard disk drive, or may be a floppy disk drive, or alternatively may represent both an internal hard disk drive and a floppy disk drive. In the event that disk drive 508 represents a floppy disk drive, then a floppy disk may be inserted therein and data stored on the floppy disk transferred to memory 506. In the event that a floppy disk is used to transfer data, the floppy disk is also represented by disk drive 508. The data may include the instructions required to operate computer system 500 to perform the functions of the bridge, as for example, discussed with reference to the flow chart of FIG. 3. The instructions to operate the bridge as described herein are written to memory 506. From memory 506 the instructions are read by CPU 504 where they are executed. Further, when disk drive 508 represents a hard disk drive internal to the bridge, the instructions may be transferred to the hard disk until they are needed, and then copied to memory 506 for execution.

Packets having canonical format supported by LAN 520 are sent and received by I/O unit 510 through LAN 520. An outgoing packet is temporarily stored in local memory 514 of I/O unit 510 before it is transmitted, and a received packet is temporarily stored in local memory 514 as it is being received. A packet may be transferred by I/O unit 510 to memory 506. CPU 504 may process any fields of a packet stored in memory 506 after the packet is received by I/O unit 510. In an illustrative embodiment of the invention, interpretation of the canonical bit 130, 233, etc. is done by circuits within I/O unit 510. In an alternative embodiment of the invention, interpretation of canonical bit 130, 233, etc. is done by CPU 504 after the packet is stored in memory 506. In either embodiment of the invention, the data packet is stored either in memory 506, or in memory 514 located in I/O unit 510.

It is to be understood that the above described embodiments are simply illustrative of the principles of the invention. Various other modifications and changes may be made by those skilled in the art which embody the principles of the invention and fall within the spirit and scope thereof.

What is claimed is:

1. A method for determining a hardware address of a first computer by a remote computer, when a protocol address of said remote computer is known to said first computer, comprising:

transmitting an address resolution protocol request (ARP Request) packet by said first computer to said remote computer, said ARP Request packet containing a canonical field, said canonical field indicating a canonical format of bytes written into said ARP Request packet, said ARP Request packet having a broadcast address in a layer 2 destination address field, and said ARP Request packet containing fields for a hardware address and a protocol address of said first computer, and having a field containing said protocol address of said remote computer;

receiving said ARP packet by said remote computer in response to said layer 2 broadcast address;

determining by said remote computer, in response to said canonical field, whether or not said canonical format of said ARP Request packet is consistent with a LAN canonical format used by a local area network (LAN) connected to said remote computer;

deciding, in response to said determining step, whether or not to perform a bit swapping operation on data stored in said ARP packet before storing said data into memory of said remote computer as canonically correct data;

updating, in response to said deciding step, an ARP table in said remote computer using canonically correct data of said hardware address of said first computer and said protocol address of said first computer in said canonical format used by said LAN connected to said remote computer, and performing said bit swapping operation on said hardware address and said protocol address before said updating step, in the event that said canonical field indicates that said canonical format of said data written into said data field of said ARP packet differs from said LAN canonical format.

2. The method as in claim 1, further comprising:

transmitting an ARP Reply packet by said remote computer to said first computer, in response to said remote computer having received said ARP Request packet from said first computer, said ARP Reply packet written in said LAN canonical format of said LAN to which said remote computer is attached, said ARP Reply packet having a canonical bit field, said canonical bit field in said ARP Reply packet indicating said LAN canonical format in which said ARP Reply packet is written.

3. The method as in claim 1 further comprising:

indicating by said canonical field that said ARP packet is written in a canonical format having a first bit of a byte being a most significant bit, and said LAN format having a canonical format having a first bit of a byte being a least significant bit.

4. The method as in claim 1 further comprising:

indicating by said canonical field that said ARP packet is written in a canonical format having a first bit of a byte being a least significant bit, and said LAN format having a canonical format having a first bit of a byte being a most significant bit.

5. A method for determining a hardware address of a remote computer by a first computer, when a protocol address of said remote computer is known to said first computer, comprising:

transmitting an address resolution protocol request packet (ARP Request packet) by said first computer with said protocol address of said remote computer written into said ARP Request packet, said ARP Request packet having a canonical field indicating a request canonical format in which said ARP Request packet was written so that said remote computer can interpret data written into fields of said ARP Request packet;

receiving an ARP Reply packet by said first computer from said remote computer, said ARP Reply packet transmitted by said remote computer in response to receiving said ARP Request packet and in response to using said request canonical field to interpret said ARP Request packet, said ARP Reply packet having a reply canonical field, said reply canonical field indicating a canonical format of data written into said ARP Reply packet, said ARP Reply packet containing both said hardware address and said protocol address of said remote computer written in a canonical format indicated by said reply canonical field;

determining by said first computer, in response to said reply canonical field, whether or not said canonical format of data written into said ARP Reply packet is consistent with a LAN canonical format used by a local area network (LAN) connected to said first computer;

deciding, in response to said determining step, whether or not to perform a bit swapping operation on data stored in said ARP Reply packet before storing said data into memory of said first computer as canonically correct data;

updating, in response to said deciding step, an ARP table in said first computer using canonically correct data of both said hardware address and said protocol address of said remote computer in said canonical format used by said LAN connected to said first computer, and performing said bit swapping operation on said hardware address and said protocol address before said updating step, in the event that said reply canonical bit indicates that said canonical format of data written into said ARP Reply packet differs from said LAN canonical format.

6. A computer comprising:

means for receiving an address resolution protocol request (ARP Request) packet transmitted by a remote computer to said computer, said ARP Request packet containing a canonical field, said canonical field indicating a canonical format of bytes written into said ARP Request packet, said ARP Request packet having a broadcast address in a layer 2 destination address field, and said ARP Request packet containing fields for a hardware address and a protocol address of said computer, and having a field containing said protocol address of said remote computer;

means for determining by said computer, in response to said canonical field, whether or not said canonical format of said ARP Request packet is consistent with a LAN canonical format used by a local area network (LAN) connected to said computer;

means for deciding, in response to said determining step, whether or not to perform a bit swapping operation on data stored in said ARP packet before storing said data into memory of said computer as canonically correct data; and means for updating, in response to said deciding step, an ARP table in said computer using canonically correct data of said hardware address of said remote computer and said protocol address of said remote computer in said canonical format used by said LAN connected to said remote computer, and performing said bit swapping operation on said hardware address and said protocol address before said updating step, in the event that said canonical field indicates that said canonical format of said data written into said data field of said ARP packet differs from said LAN canonical format.

7. A computer readable media comprising:

said computer readable media containing instructions for execution in a processor for the practice of the method of claim 1 or claim 5.

8. Electromagnetic signals propagating on a computer network, comprising:

said electromagnetic signals carrying instructions for execution on a processor for the practice of the method of claim 1 or claim 5.

* * * * *